US011243841B2

(12) United States Patent
Takahashi

(10) Patent No.: US 11,243,841 B2
(45) Date of Patent: Feb. 8, 2022

(54) SALES DATA PROCESSING APPARATUS AND METHOD

(71) Applicant: TOSHIBA TEC KABUSHIKI KAISHA, Tokyo (JP)

(72) Inventor: Akira Takahashi, Yokohama Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/118,258

(22) Filed: Dec. 10, 2020

(65) Prior Publication Data
US 2021/0263800 A1    Aug. 26, 2021

(30) Foreign Application Priority Data

Feb. 25, 2020 (JP) .............................. JP2020-029636

(51) Int. Cl.
*G06F 11/14*     (2006.01)
*G06Q 20/20*     (2012.01)

(52) U.S. Cl.
CPC ...... *G06F 11/1438* (2013.01); *G06F 11/1417* (2013.01); *G06Q 20/20* (2013.01)

(58) Field of Classification Search
CPC .. G06F 11/1417; G06F 11/1438; G06Q 20/20
See application file for complete search history.

(56) References Cited

U.S. PATENT DOCUMENTS 7,523,182 B2* 4/2009 Godwin ................. G06Q 20/20
702/185
9,787,858 B2* 10/2017 Sato ..................... G06K 15/022
2002/0065775 A1  5/2002 Monaghan
2006/0131380 A1  6/2006 Forrest et al.
2012/0123880 A1* 5/2012 Craft ..................... G06Q 20/20
705/16
2014/0107836 A1  4/2014 Crews et al.

FOREIGN PATENT DOCUMENTS

EP      0977162 A2    2/2000
JP      H06236486 A   8/1994
JP      2019021058 A  2/2019

OTHER PUBLICATIONS

Extended European Search Report dated Jul. 28, 2021, mailed in counterpart European Application No. 21155311.0, 8 pages.

* cited by examiner

*Primary Examiner* — Joseph R Kudirka
(74) *Attorney, Agent, or Firm* — Kim & Stewart LLP

(57) ABSTRACT

A sales data processing apparatus includes a display, a product scanner to obtain a commodity code from a product being registered in a sales transaction, a storage unit to store journal data including product information for registered. A controller is configured to record product information for products registered in the sales transaction and output a notification of an error in the sales transaction when detected. The notification is output to the display screen and includes information regarding resolution of the error. The controller executes a first countermeasure for resolving the error, then stops the sales transaction if the error is not resolved. The controller then executes a second countermeasure after the sales transaction has been stopped and starts a new transaction if the error is resolved by the second countermeasure.

20 Claims, 5 Drawing Sheets

SALES DATA PROCESSING APPARATUS AND METHOD

CROSS-REFERENCE TO RELATED APPLICATION

This application is based upon and claims the benefit of priority from Japanese Patent Application No. 2020-029636, filed on Feb. 25, 2020, the entire contents of which are incorporated herein by reference.

FIELD

Embodiments described herein relate generally to a sales data processing apparatus and a sales data processing method.

BACKGROUND

There has been a demand for sales data processing apparatuses for which minor errors can be resolved without depending on maintenance personnel. This demand has grown with the introduction self-checkout apparatuses in retail stores and the increasing prevalence of stores that are unmanned or having only a small number of personnel available.

Certain technologies for resolving errors in a sales data processing apparatus without depending on maintenance personnel have been disclosed before. In such known examples, the device that causes the error must be disconnected or taken offline even though sales data processing apparatus are preferably continuously used or at least available for customer use.

However, when an error occurs due to, for example, the timing of communication with another device overlaps, there are many cases where the error can be resolved by re-executing the same process again, resetting a device sub-component to a previous state, or rebooting the entire apparatus. When such relatively quickly fixable errors occur, it is not appropriate to resolve the error by entirely disconnecting the sales processing apparatus.

DETAILED DESCRIPTION

A sales data processing apparatus and a sales data processing method according to at least one example embodiment can resolve certain errors without requiring intervention of maintenance personnel or the like.

According to an embodiment a sales data processing apparatus includes a display screen, a product scanner to obtain a commodity code from a product being registered in a sales transaction, and a storage unit configured to store journal data including product information for products registered in the sales transaction. A controller is configured to record product information for products registered in the sales transaction in the storage unit as the journal data and output a notification of an error in the sales transaction when the error is detected. The notification is output to the display screen and includes information regarding an operation for resolving the error. The controller is configured to execute a first countermeasure for resolving the error and stop the sales transaction if the error is not resolved by execution of the first countermeasure. The controller executes a second countermeasure for resolving the error after the sales transaction has been stopped. The controller is configured to start a new sales transaction if the error is resolved by execution of the second countermeasure. In some examples, the previously recorded product information in the stored journal data can be loaded into the new sales transaction if desired.

Certain non-limiting example embodiments will be described below with reference to the drawings.

First Embodiment

Figure 1:
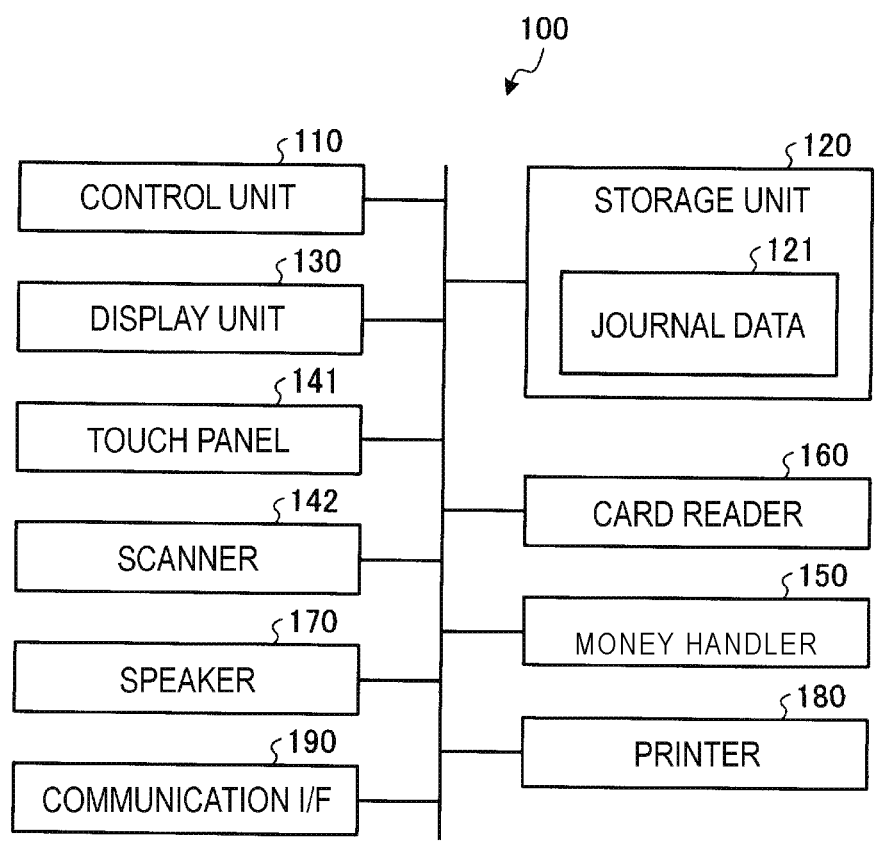
FIG. 1 is a block diagram of a configuration of a sales data processing apparatus according to an embodiment.

FIG. 1 is a block diagram of a sales data processing apparatus 100 according to an embodiment. The sales data processing apparatus 100 includes a control unit 110, a storage unit 120, a display unit 130, a touch panel 141, a scanner 142, a money handler 150, a card reader 160, a speaker 170, a printer 180, a communication interface (I/F) 190 and the like. Examples of the sales data processing apparatus 100 include a self-checkout apparatus by which a customer himself or herself performs merchandise registration and settlement operations, and a POS terminal apparatus operated by a salesclerk or the like.

The control unit 110 includes a central processing unit (CPU), a read only memory (ROM), a random access memory (RAM), and the like, and provides overall control of each sub-unit of the sales data processing apparatus 100. The control unit 110 realizes various functional operations by executing a program on the CPU. Such a program may be stored in the ROM or otherwise for execution. The control unit 110 may be referred to as a controller.

The storage unit 120 is, for example, a storage apparatus such as a hard disk drive (HDD) or a solid-state drive (SSD). The storage unit 120 stores various programs executable by the control unit 110, setting information, operation parameters, and the like. The storage unit 120 also stores journal data 121 and a PLU file.

The PLU file stores commodity information related to items of merchandise or categories of merchandise for sale at the store. The stored commodity information associates product codes (merchandise codes) with commodity classifications, merchandise names, unit prices, and example images depicting merchandise associated with the product code. In this context, a merchandise code is identification information uniquely assigned to merchandise. For example, the merchandise code may be based on a JAN (Japanese Article Number) code system or the like. A bar code attached to items of merchandise can encode the merchandise code for each item. Such a coded merchandise code (code symbol) can then be read and decoded by a bar code reader or the like.

The journal data 121 is history data for sales transactions and includes information on the items of merchandise that have been registered as part of the sales transaction for settlement.

The display unit 130 is, for example, a display apparatus such as a liquid crystal display, and displays information of the sales data processing apparatus 100 to an operator of the apparatus. The touch panel 141 can be provided overlapping the surface of the display unit 130 and receives an input operation according to contents of a graphical user interface displayed on the display unit 130. The scanner 142 is used to read a code symbol, such as a barcode, that is attached to merchandise. The code symbol provides a merchandise code for the item of merchandise.

The money handler 150 is used for receiving cash/coin payments and returning change to the customer for transaction settlement. The card reader 160 reads information recorded on a credit card or the like and can be used for transaction settlement without cash. The printer 180 prints and issues a receipt which is a record of the sales transaction.

The speaker 170 emits sound and to notify a user/operator of information by sound. For example, the speaker 170 may emit a voice sound. The communication I/F 190 mediates transmission and reception of data with an external apparatus (for example, a store server or the like) via a network.

Figure 2:
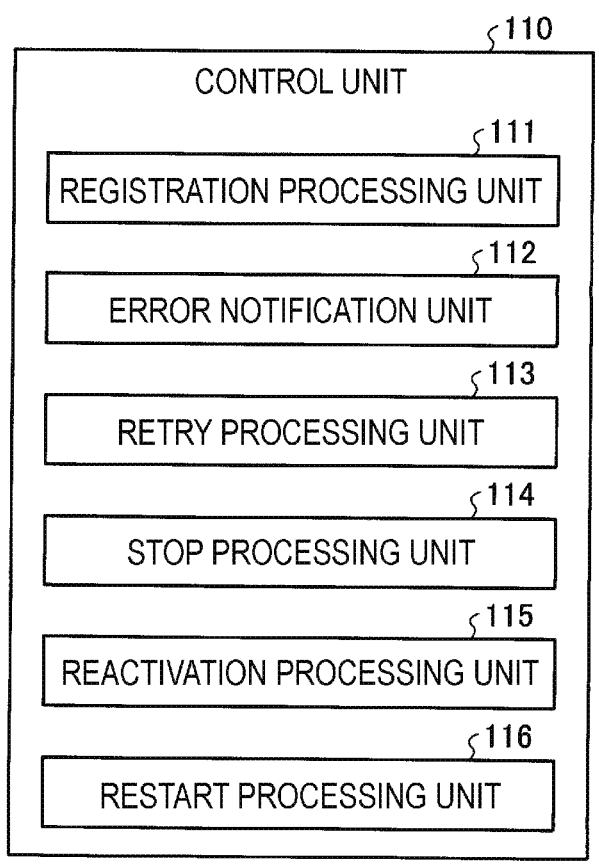
FIG. 2 is a block diagram depicting functional aspects of a control unit.

FIG. 2 is a block diagram illustrating functional aspects of the control unit 110. The control unit 110 executes various programs stored in the ROM, various functional units are realized by execution of such programs. In this example, the control unit 110 executes at least one program and provides the functions of a registration processing unit 111, an error notification unit 112, a retry processing unit 113, a stop processing unit 114, a reactivation processing unit 115, a restart processing unit 116 according to the execution of the at least one program. That is, control unit 110 is configured by software to provide the various functional units depicted in FIG. 2. The retry processing unit 113 and the reactivation processing unit 115 together form a resolution processing unit in which countermeasures for resolving an error in the sales data processing apparatus 100 are performed in a stepwise manner.

The registration processing unit 111 records the information of the merchandise being registered in a single sales transaction. Specifically, the registration processing unit 111 records commodity information obtained according the code information (merchandise code) output by the scanner 142 reading a code symbol such as a barcode attached to the items of merchandise. The commodity information associated with the code merchandise code is obtained from the PLU file in the storage unit 120. The registration processing unit 111 also records the commodity information for registered commodities as journal data 121.

The error notification unit 112 notifies the operator of various errors that may occur during the registration process. These notifications to the operator are made via the display unit 130 and/or the speaker 170. For example, the error notification unit 112 informs the operator of the occurrence of an error in the transaction and also the operation(s) for resolving the error.

The retry processing unit 113 executes a first-step (first level) countermeasure for resolving an error. The first-step countermeasure is, for example, to retry (re-execute) the same process as the process during which the error occurred. The retry processing unit 113 can re-executes the process multiple times if the re-execution of the process fails again. The re-execution can be attempted up to a predetermined number of times, for example.

The stop processing unit 114 stops the transaction if the error is not resolved by operation(s) of the retry processing unit 113.

The reactivation processing unit 115 receives the stop transaction notice from the stop processing unit 114, and then executes a second-step (second level) countermeasure for resolving the error. The second-step countermeasure is, for example, to reset the sub-device or component in which the error (malfunction) is considered to have occurred.

The reactivation processing unit 115 can execute a third-step (third level) countermeasure for resolving the error if the error is not resolved by the second-step countermeasure. The third-step countermeasure is to reset the sales data processing apparatus 100 entirely. In this context, a reset of device, sub-device, a component, or the entire sales data processing apparatus 100 may also be referred to as a restart, a reactivation, and/or a reboot.

In the embodiment, the countermeasures for resolving the error is divided into three steps or stages. In general, the time required for clearing the error using the countermeasure of each step increases with each step. The third step takes the longest time, so typically the intention of the operator to take this step is confirmed before execution. The confirmation of intention here can be confirmation of whether or not the presently stopped transaction is intended to be restarted (continued) after the performance of the third step countermeasure.

The restart processing unit 116 starts a new transaction after the countermeasure by the reactivation processing unit 115 has been initiated and then completed. The restart processing unit 116 automatically executes the registration of the merchandise that was already registered in the transaction that was previously interrupted (stopped) by the stop processing unit 114. The re-registration of merchandise in the new transaction is based on the journal data 121 recorded by the registration processing unit 111 in the previous transaction.

In registering items in a sales transaction with the sales data processing apparatus 100, typically items of merchandise are scanned (read) by the scanner 142 which reads a barcode attached to the merchandise, then registers the information for the item of merchandise corresponding to the barcode as read. The sales data processing apparatus records the information for each registered item as the journal data 121. Upon completion of the registration of items, the sales data processing apparatus 100 receives payment from the customer. The payment can be received by the money handler 150 or the card reader 160. The sales data processing apparatus 100 issues a transaction receipt (receipt) via the printer 180. The display unit 130 displays information for the operator such as operation guidance during the various processes, the touch panel 141 receives input operation from the operator, and the speaker 170 emits sound(s) as necessary.

Figure 3:
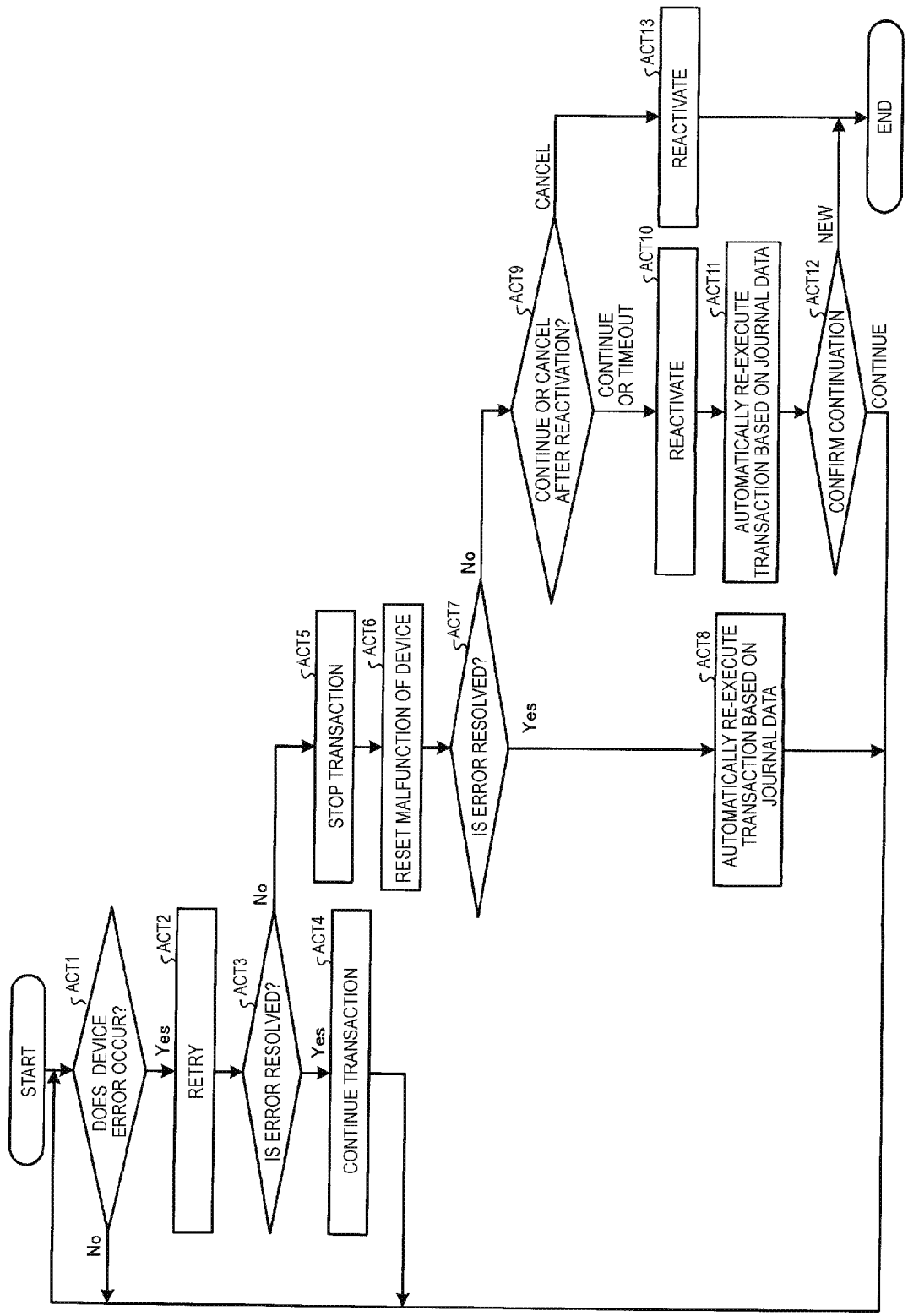
FIG. 3 is a flowchart of a process executed by a control unit.

The sales data processing apparatus 100 performs the process illustrated in FIG. 3 when an error occurs during sales transaction processing. FIG. 3 is a flowchart illustrating an example of the processing executed by the control unit 110. In the sales data processing apparatus 100 of the present embodiment, an empirical resolution method that might typically be performed by an experienced salesclerk to recover the apparatus from an error can be automated.

As the error, a timing-dependent error may occur. Such an error occurs when the scanner 142 tries to read a barcode, but the barcode reading (fails due to overlapping in time of the communication interrupt of another device or a response to a communication. Similarly, timing-dependent error may occur when the printer 180 attempts to issue a receipt but fails to do so. In general, there are many cases where a timing-dependent error occurs due to overlapping in time of various signals during the operations of a connected device. Often, the error can be resolved if the transaction is started again or the failed process is simply attempted again.

Figure 4:
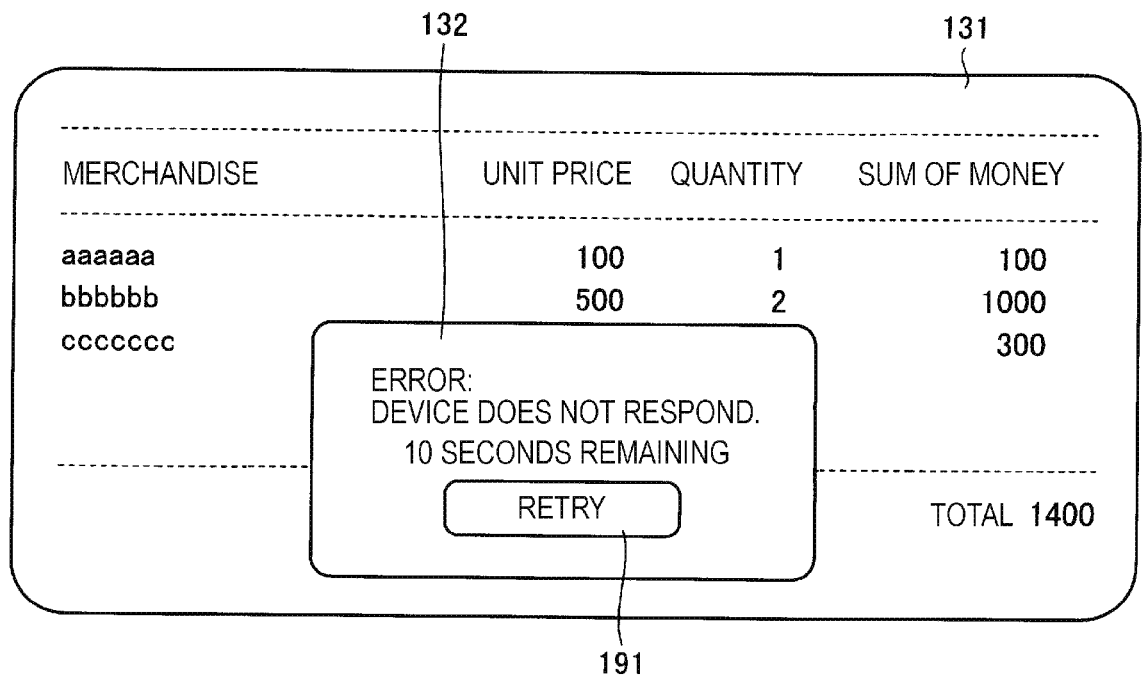
FIG. 4 is a view illustrating a display screen example for a display unit.

When a device error occurs (Yes in ACT 1), the control unit 110 performs the first-step countermeasure with the retry processing unit 113. That is, control unit 110 retries (re-executes) the process that was being performed when the current error occurred (ACT 2). Here, FIG. 4 is a view illustrating a display screen example of the display unit 130 at this time.

In ACT 2, due to the error notification unit 112, the control unit 110 displays a notification screen 132 on the display unit 130, overlapping a merchandise registration screen 131 that was being displayed at the time of the error. The notification screen 132 displays a countdown of the remaining time until the start of retry attempt, such as "10 seconds remaining", in addition to the message indicating the status message "Error: Device does not respond". In addition, the notification screen 132 functions as a user interface including a retry button 191 that receives an input operation to start the retry attempt immediately without waiting for the remaining time to elapse.

In the next ACT 3, if the error is resolved by the retry (Yes in ACT 3), the control unit 110 continues the transaction with the merchandise registration screen 131 (ACT 4), and then returns the process to ACT 1.

In ACT 3, if the error is not resolved by one retry attempt, the control unit 110 can automatically repeat the retry attempts up to a predetermined limit (for example, three attempts). When the error is still not resolved (No in ACT 3), the control unit 110 stops the current transaction with the stop processing unit 114 (ACT 5) and performs the second-step countermeasure with the reactivation processing unit 115, that is, the reset (reactivation) of a device in which the malfunction is considered to have occurred is performed (ACT 6).

In the next ACT 7, if the error is resolved by the reset (Yes in ACT 7), the control unit 110 automatically re-starts the previous transaction based on the journal data 121 using the restart processing unit 116 (ACT 8), and then returns the processing to ACT 1.

Figure 5:
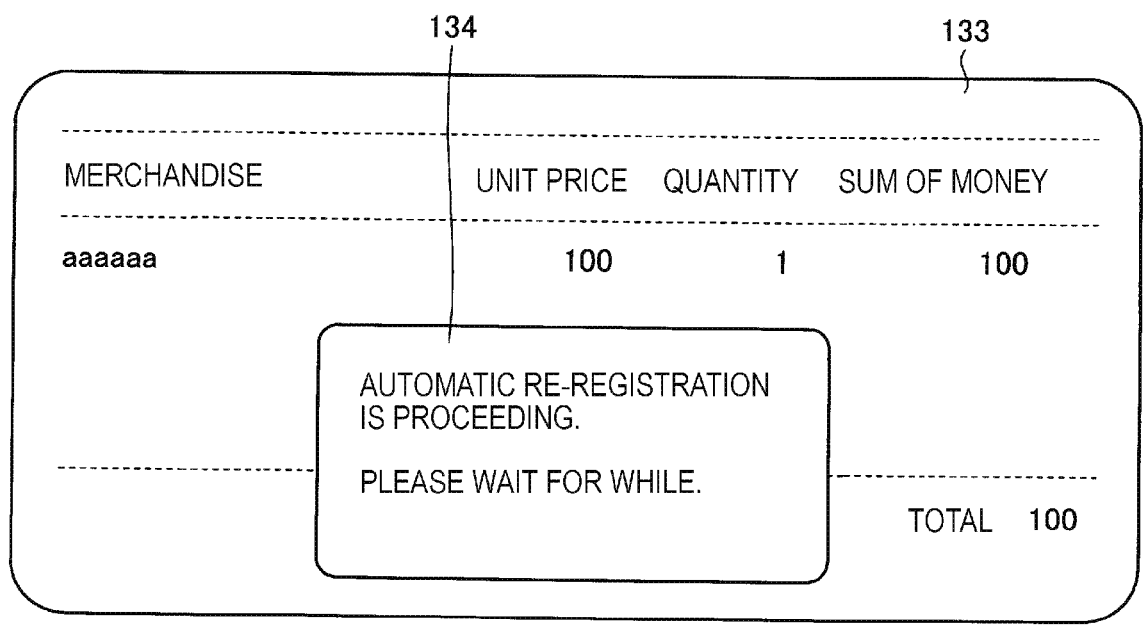
FIG. 5 is a view illustrating a display screen example for a display unit.

In the process of ACT 8, the control unit 110 first starts a new transaction. Next, by reference to the stored journal data 121 for the stopped transaction, the information for the previously registered merchandise of the stopped transaction is acquired. The stopping of the transaction in ACT 5 may include storage and/or transfer of the journal data 121 for the transaction being stopped. In any event, the acquired information for the merchandise from the journal data 121 is reflected in the new transaction. That is, in effect, the stopped transaction is started again from its stopping point, or as near as possible according to the stored journal data 121. FIG. 5 is a view illustrating a display example of the display unit 130 at this time.

In ACT 8, the control unit 110 displays a merchandise registration screen 133 for the newly launched transaction. The control unit 110 displays a notification screen 134, overlapping the merchandise registration screen 133. The notification screen 134 displays, while the journal data 121 is acquired and/or reloaded for the new transaction, a message telling the operator the status message "Automatic re-registration is in progress. Please wait for a while."

Figure 6:
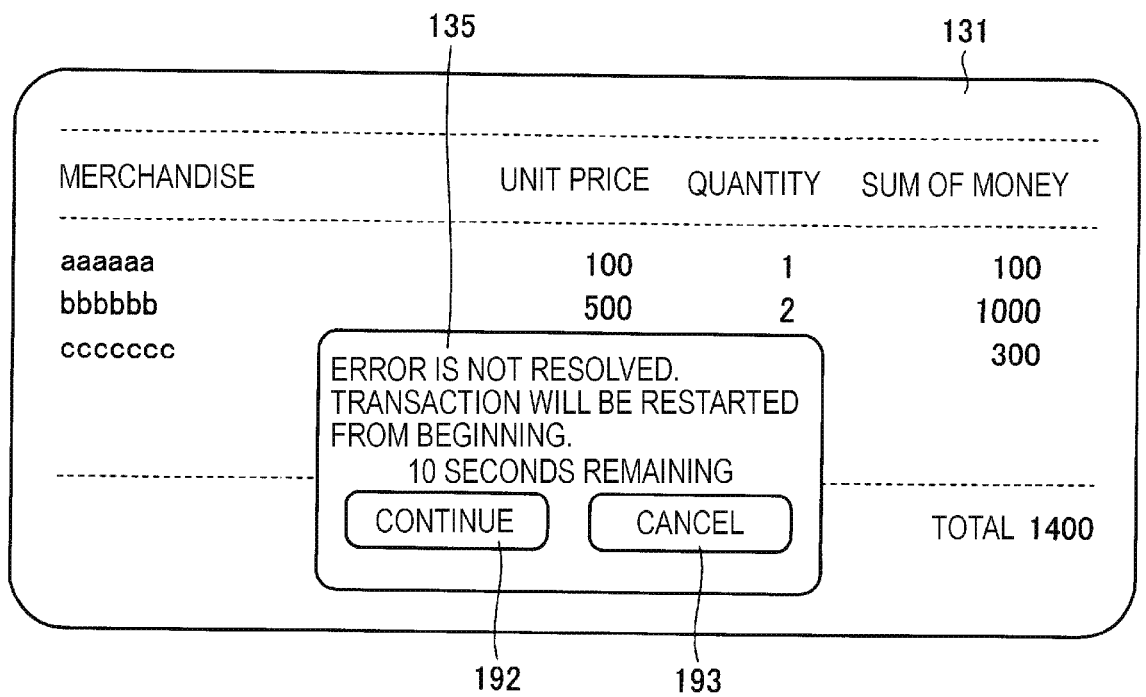
FIG. 6 is a view illustrating a display screen example for a display unit.

In ACT 7, if the error is not resolved by the reset (No in ACT 7), the control unit 110 performs an operation to confirm the intention of the operator to reboot/restart the entire sales data processing apparatus 100, which is considered to require approximately several minutes at least (ACT 9). FIG. 6 is a view illustrating a display example of the display unit 130 at this time.

In ACT 9, the control unit 110 displays a notification screen 135 on the display unit 130, overlapping the merchandise registration screen 131 displayed when the error occurred. The notification screen 135 displays a countdown of the remaining time until the reactivation is started, such as "10 seconds remaining" in addition to the message telling the operator the status message "Error is not resolved. Transaction will be restarted from the beginning." Furthermore, the notification screen 135 functions as a user interface including buttons 192 and 193 that can receive an input operation for immediately preceding to the next process without waiting for the remaining time to elapse.

When continue button 192 is selected (continue; ACT 9), the control unit 110 understands that there is an intention to continue the current registration process after the reboot process has completed and proceeds the process to ACT 10. If the countdown of the remaining time elapses is without either of the buttons 192 and 193 being selected (timeout; ACT 9), the control unit 110 proceeds the process to ACT 10 in the same manner as when the continue button 192 is pressed.

In ACT 10, the control unit 110 performs the third-step countermeasure with the reactivation processing unit 115, that is, the reset (reboot) of the entire system of the sales data processing apparatus 100 is performed. Subsequently, the control unit 110 automatically re-executes the transaction based on the journal data 121 by the restart processing unit 116 (ACT 11). The process in ACT 11 is substantially same as the process described for ACT 8.

Figure 7:
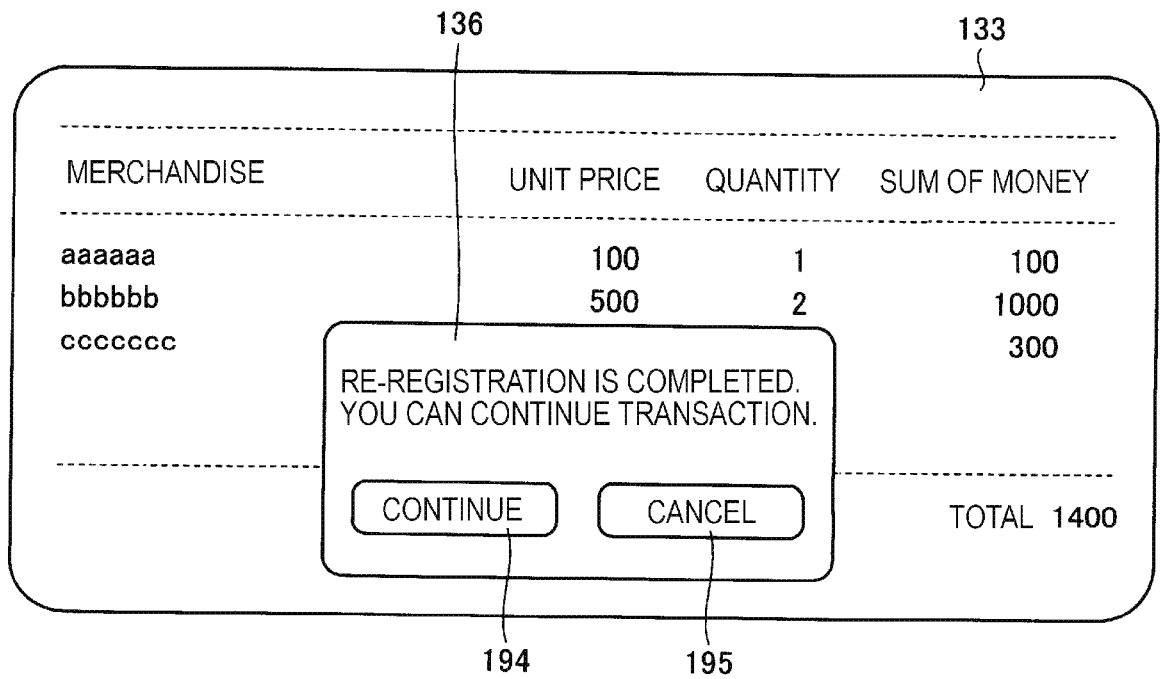
FIG. 7 is a view illustrating a display screen example for a display unit.

Next, the control unit 110 confirms the intention for continuation with the operator (ACT 12). FIG. 7 is a view illustrating a display example of the display unit 130 at this time. The control unit 110 displays a notification screen 136, overlapping the merchandise registration screen 133 for the newly launched transaction. The notification screen 136 displays a message telling the operator the status message "Re-registration is completed. You can continue the transaction." The notification screen 136 functions as a user interface including buttons 194 and 195 that receive an input operation from the operator to indicate an intention to begin a new transaction or continue the previously stopped transaction.

If a continue button 194 is selected, the control unit 110 understands that there is an intention to continue with the restarted transaction (re-registered transaction) (continue; ACT 12) and returns the process to ACT 1. If cancel button 195 is selected, the control unit 110 understands that the re-registered transaction is not to be continued (new; ACT 12) and ends the process.

When the cancel button 193 is pressed in ACT 9 (cancel; ACT 9), the control unit 110 understands that the current registration process is not to be continued after the reboot of the entire sales transaction processing apparatus 100 in subsequent ACT 13, and thus the process ends after ACT 13.

As described above, according to the sales data processing apparatus 100 of the embodiment, since the error resolving method can be automatically performed, the error can be resolved without depending on a maintenance worker or even an experienced salesclerk. Therefore, even when the customer is operating a self-checkout apparatus in a store that is unmanned or has only a small number of personnel, or when an attending salesclerk is inexperienced in the operations of a POS-type terminal apparatus, the error in the sales data processing apparatus 100 can be resolved, and the transaction can be continued.

In the embodiment, among the stepwise countermeasures for resolving the error, the second-step and third-step countermeasures can be implemented. However, the present disclosure is not limited thereto, and in some examples, only one or the other of the second-step countermeasure and the third-step countermeasure may be possible to be performed. That is, only two levels of countermeasures may be implemented. However, positive effects similar to those of the above-described embodiment can still be obtained as compared with the cases of the related art.

The program executed by the sales data processing apparatus 100 can be provided by being installed in ROM of the control unit 101 or the like in advance.

The program executed by the sales data processing apparatus 100 may be recorded and provided in a non-transitory recording medium that can be read by a computer as a file in an installable format or an executable format in a CD-ROM, a flexible disk (FD), a CD-R, a digital versatile disk (DVD) and the like.

Further, the program executed by the sales data processing apparatus 100 may be stored in a computer connected to a network such as the Internet and provided by being downloaded via the network. Furthermore, the program executed by the sales data processing apparatus 100 may be provided or distributed via a network such as the Internet.

In addition, the program executed by the sales data processing apparatus 100 has been described as a module configuration providing the above-described functional units (the registration processing unit 111, the error notification unit 112, the retry processing unit 113, the stop processing unit 114, the reactivation processing unit 115, and the restart processing unit 116). In general, the CPU (processor) of the control unit 100 loads each of modular units onto a main memory (RAM) by reading the program from a storage medium. Accordingly, the registration processing unit 111, the error notification unit 112, the retry processing unit 113, the stop processing unit 114, the reactivation processing unit 115, and the restart processing unit 116 are generated.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sales data processing apparatus, comprising:
   a display screen;
   a product scanner to obtain a commodity code from a product being registered in a sales transaction;
   a storage unit configured to store journal data including product information for products registered in the sales transaction; and
   a controller configured to:
   record product information for products registered in the sales transaction in the storage unit as the journal data,
   output a notification of an error in the sales transaction when the error is detected, the notification being output to the display screen and including information regarding an operation for resolving the error,
   execute a first countermeasure for resolving the error,
   stop the sales transaction if the error is not resolved by execution of the first countermeasure,
   execute a second countermeasure for resolving the error after the sales transaction has been stopped, and
   start a new sales transaction if the error is resolved by execution of the second countermeasure.

2. The sales data processing apparatus according to claim 1, wherein the controller is further configured to load the journal data recorded for the stopped transaction into the new sales transaction once the new sales transaction has been started.

3. The sales data processing apparatus according to claim 1, wherein the first countermeasure is reattempting a failed process up to a predetermined number of times.

4. The sales data processing apparatus according to claim 1, wherein the first countermeasure is reattempting a failed process.

5. The sales data processing apparatus according to claim 4, wherein the second countermeasure is restarting one sub-component of the sales data processing apparatus.

6. The sales data processing apparatus according to claim 4, wherein the second countermeasure is rebooting the sales data processing apparatus.

7. The sales data processing apparatus according to claim 4, wherein the controller is further configured to execute a third countermeasure for resolving the error if the sales transaction has been stopped and the second countermeasure has failed to resolve the error.

8. The sales data processing apparatus according to claim 7, wherein the third countermeasure is rebooting the sales data processing apparatus.

9. The sales data processing apparatus according to claim 1, wherein, after the stopping of the sales transaction, the controller is configured to display a user interface screen on the display screen requesting a user to confirm an intention to continue the stopped transaction.

10. A sales data processing apparatus, comprising:
    a registration processing unit configured to record information of merchandise being purchased in a sales transaction;
    an error notification unit configured to output a notification of an error in the sales transaction and information regarding an operation for resolving the error;
    a resolution processing unit configured to automatically execute a series of countermeasures for resolving the error;
    a stop processing unit configured to stop the sales transaction when the error is not resolved by a first countermeasure in the series of countermeasures performed by the resolution processing unit; and
    a restart processing unit configured to start a new sales transaction after the sales transaction has been stopped by the stop processing unit and a second countermeasure in the series of countermeasures has been performed by the resolution processing unit.

11. The sales data processing apparatus according to claim 10, wherein the restart processing unit is configured to register the merchandise previously registered in the sales transaction stopped by the stop processing unit in the new sales transaction, the previously registered merchandise in the stopped sales transaction being determined based on the information recorded by the registration processing unit.

12. The sales data processing apparatus according to claim 11, wherein the restart processing unit is configured to provide a user interface for confirming an intention of an operator to continue the stopped sales transaction after the start of the new sales transaction.

13. The sales data processing apparatus according to claim 10, wherein the restart processing unit is configured to provide a user interface capable of receiving an input operation for cancelling the continued transaction.

14. The sales data processing apparatus according to claim 10, wherein the resolution processing unit is configured to:
   perform a retrying of a process as the first countermeasure, and
   perform one of resetting a sub-component of the sales data processing apparatus and rebooting the sales data processing apparatus as the second countermeasure.

15. The sales data processing apparatus according to claim 10, wherein each of the registration processing unit, the error notification unit, the resolution processing unit, the stop processing unit, and the restart processing unit is implemented by a processor executing a software program.

16. A method of controlling a sales data processing apparatus, the method comprising:
   recording product information for products registered in a sales transaction in a storage unit as journal data;
   outputting a notification of an error in the sales transaction when the error is detected, the notification being output to a display screen and including information regarding an operation for resolving the error;
   executing a first countermeasure for resolving the error;
   stopping the sales transaction if the error is not resolved by execution of the first countermeasure;
   executing a second countermeasure for resolving the error after the sales transaction has been stopped; and
   starting a new sales transaction if the error is resolved by execution of the second countermeasure.

17. The method according to claim 16, further comprising:
   loading the journal data recorded for the stopped transaction into the new sales transaction once the new sales transaction has been started.

18. The method according to claim 16, wherein the first countermeasure is reattempting a failed process.

19. The method according to claim 16, wherein the second countermeasure is restarting one sub-component of the sales data processing apparatus.

20. The method according to claim 16, further comprising:
   executing a third countermeasure for resolving the error if the sales transaction has been stopped and the second countermeasure has failed to resolve the error.

* * * * *